United States Patent [19]
Nearman

[11] 3,786,952
[45] Jan. 22, 1974

[54] BI-DIRECTIONAL FORK APPARATUS

[76] Inventor: Richard E. Nearman, Rt. 3 Box 90, Mount Airy, Md. 21771

[22] Filed: Nov. 1, 1972

[21] Appl. No.: 302,643

[52] U.S. Cl............................... 214/731, 214/750
[51] Int. Cl................................................ B66f 9/14
[58] Field of Search ...... 214/16.4 A, 730, 731, 750, 214/DIG. 10

[56] References Cited
UNITED STATES PATENTS

| | | | |
|---|---|---|---|
| 2,605,918 | 8/1952 | Roscoe | 214/731 |
| 2,643,784 | 6/1953 | Turner et al. | 214/731 |
| 2,774,498 | 12/1956 | Cordes et al. | 214/731 |

Primary Examiner—Gerald M. Forlenza
Assistant Examiner—Lawrence J. Oresky
Attorney, Agent, or Firm—Jacobi, Lilling & Siegel

[57] ABSTRACT

Bi-directional, side loading fork apparatus adapted to be mounted on a vertically movable mounting structure or base mounted on a lift vehicle of any suitable construction. The lift vehicle is adapted to be positioned and operated in an aisle between two storage racks where pallets are to be stored. A supporting frame is mounted on the base and is laterally movable relative thereto, the frame being of a width that is only slightly less than that of the aisle between the storage racks. A shuttle platform or head is mounted on the supporting frame and is laterally movable relative thereto between the storage racks. A pair of forks are rotatably mounted on the shuttle platform for rotation about a substantially vertical axis so that the direction of the forks can be reversed. Means are provided on the shuttle platform for guiding one of the forks over the other fork as they are simultaneously rotated during reversal of their positions. The forks and shuttle platform are so interconnected that the forks are rotated to accomplish reversal as the shuttle platform is moved laterally between the storage racks. In this manner, the direction of the forks can be reversed without the forks extending beyond the width of the supporting frame, thereby minimizing the aisle space required for the subject side-loading fork apparatus and allowing 100% selectivity of pallets in any given storage rack aisle without the necessity of reversing the direction of the lift vehicle.

16 Claims, 12 Drawing Figures

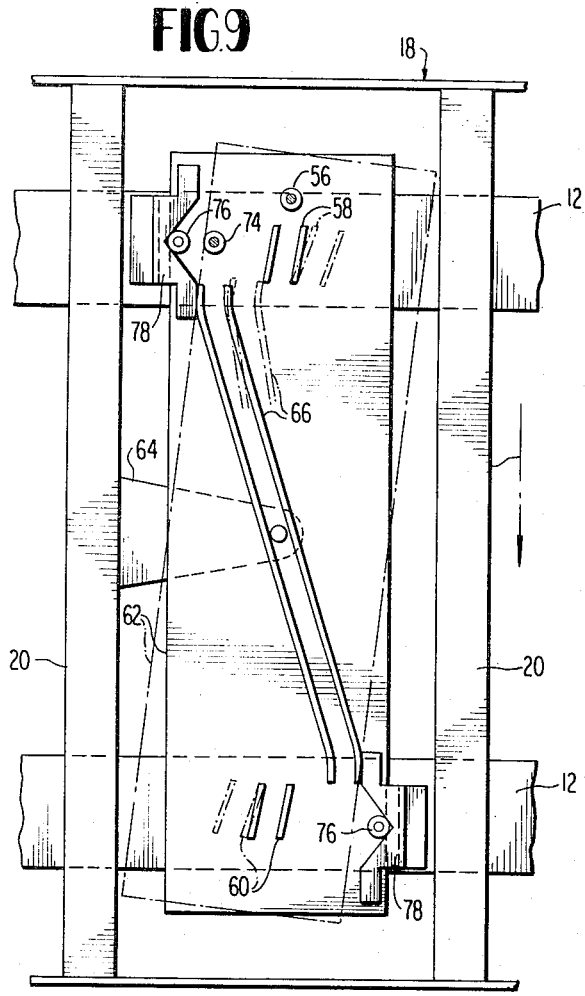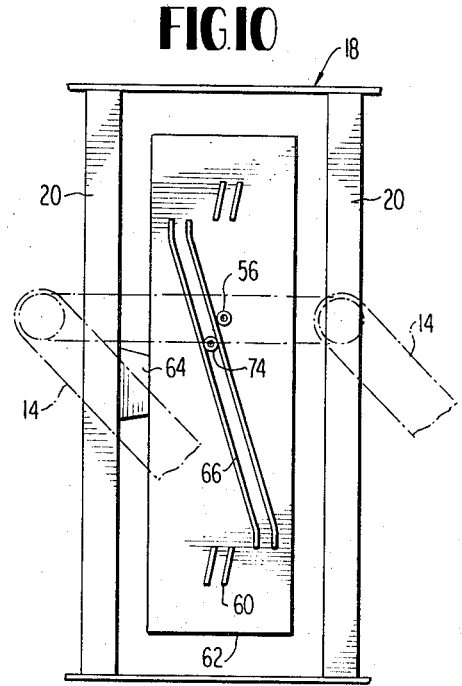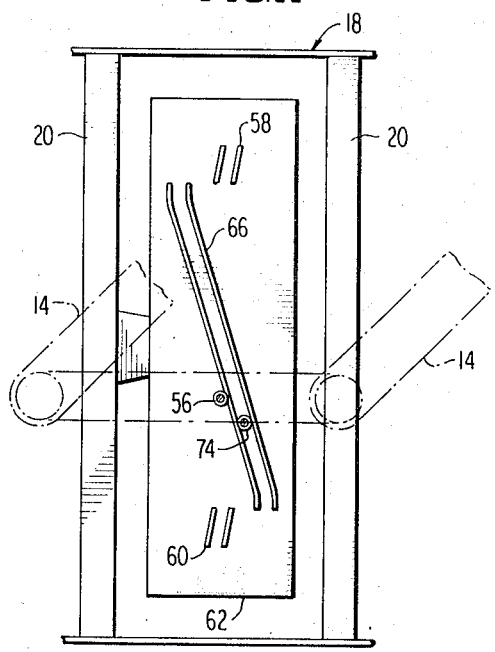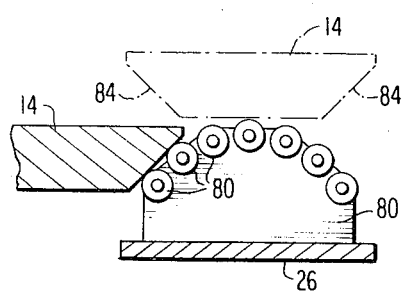

BI-DIRECTIONAL FORK APPARATUS

BACKGROUND OF THE INVENTION

Fork lift vehicles have gained wide acceptance for moving palletized loads into and out of pallet rack storage systems. To accomplish this, the forks of the vehicle are inserted between the decks of the pallet, the pallet is lifted and the vehicle is driven with the load into an aisle between two storage racks to a location where the pallet is to be stored. The construction of the vehicle is such that it must be turned at 90° to the axis of the aisle in order to deposit the load into the racks. As a result, the aisle width becomes several times the length of the load and the percentage of volume actually used for storage to volume available in a given area is quite low.

Since the introduction of the first lift vehicles, equipment has been developed to minimize the size of the aisles and thereby increase the density of storage. Vehicles have been constructed in which the lifting mast and forks either rotate 90° to one side of the vehicle axis or are fixed at 90° to the vehicle axis. These vehicles have measurably reduced the aisle space required, but still result in wasting a significant amount of storage space.

With the advent of the stacker-retriever utilizing a shuttle platform, the minimum aisle for a 100 percent selectivity storage system was achieved. The shuttle platform travels laterally or transversely to the vehicle axis and requires an aisle only a few inches wider than the load being handled. The design of the shuttle platform is such that it supports the load with the pallet resting on its platform, as opposed to forks which are inserted between the pallet decks and support the load from the upper pallet deck. Because of this feature of the shuttle platform, single opening storage racks versus double or multiple opening racks must be utilized in the storage system. As a result, twice the number of upright frames must be incorporated into a shuttle system as opposed to a fork system. As a general rule, the storage system (racks) represents 80–80 percent of the overall system cost in a retriever type system.

From a standpoint of cost, therefore, the comparison is: more tons of steel to buy, handle, ship and erect versus a slightly wider aisle (more bricks and mortar). Under present and predicted economic conditions, the cost differential is so great that the wider aisles necessitated by a fork type unit are more easily justified. At the present time, all stacker-retrievers utilize a shuttle type carrier and are either fully or semi- automatic which, because of control problems, precludes using a fork-type side loading apparatus.

At the present time, equipment exists which will accomplish the same basic function as the present invention. In one version of this equipment, forks rotate about a horizontal axis in a vertical plane from side to side and are mounted on a laterally movable shuttle or head such that the direction of the forks may be reversed without the forks extending beyond the width of the base or platform on which the shuttle is mounted. Such a unit is currently being manufactured and marketed as a fork- truck attachment by Hydromation Inc., of Orange, Connecticut.

A second version of this equipment embodies forks which move laterally through the laterally movable shuttle or head to achieve the two-sided action. Such a unit is currently being manufactured and marketed on a system basis by C & M Manufacturing Company Inc., of Bethesda, Maryland.

Existing bi-directional, side-loading equipment is subject to various disadvantages. For example, existing units must depend upon close tolerances for reliable operation, are subject to wear as a result of constant use, and have little or no provision to compensate for wear or deflection. In addition, some of the existing side-loading units require a substantial amount of space to accomplish fork reversal, require a substantial amount of energy to reverse the forks, and require complicated systems for insuring synchronization of movement.

It will be readily seen, therefore, that a need has arisen for a side-loading, bi-directional fork apparatus wherein the direction of the forks can be reversed in a minimum amount of aisle space without reversing the direction of the lift vehicle and without being subject to the disadvantages of the presently available apparatus.

SUMMARY OF THE INVENTION

The side-loading bi-directional fork apparatus of the present invention is not subject to the disadvantages of the presently available apparatus of this type, and possesses many advantages which are not possible with the use of the prior art apparatus.

The apparatus of the present invention comprises a supporting frame which is adapted to be mounted for lateral movement on a vertically movable base or mounting structure of a lift vehicle. The width of the supporting frame preferably is only slightly less than the width of the aisle between storage racks in which the lift vehicle is operable.

A shuttle platform or head is mounted on the supporting frame for lateral movement between the racks on either side of the aisle in the storage system. A pair of forks are independently rotatably mounted on the shuttle platform or base for rotation about substantially vertical axes. Means are provided on the platform for guiding one of the forks over the other fork as the forks are being rotated through an angle of 180° to effect reversal of fork direction.

The shuttle platform and forks are so interconnected that lateral movement of the platform relative to the supporting frame can result in fork rotation and reversal of fork direction without the forks extending beyond the lateral edges of the supporting frame. In this manner, fork direction can be reversed in aisle space that is only slightly wider than the width of the supporting frame.

The shuttle platform and supporting frame are so interconnected that lateral movement of the supporting frame relative to the lift vehicle base prevents fork rotation. In this mode, lateral movement of the shuttle platform results in lateral movement of the forks into the rack opening for depositing or retrieving a pallet.

Although the forks, shuttle platform and supporting frame may be interconnected in any suitable manner for fork reversal, a preferred embodiment of the present invention utilizes cam and roller connections between these members to assure synchronization of movement, simplification of controls, minimum wear and ease of adjustment to compensate for wear or deflection.

For pallet loads in excess of 3000 pounds the slope experienced by the forks extended into a rack opening as a result of the cumulative deflection of all of the structural members requires re-leveling of the forks under load. A preferred embodiment of the present invention incorporates a hydraulic cylinder between the interface of each fork and its respective bracket to accomplish the re-leveling.

BRIEF DESCRIPTION OF THE DRAWINGS

FIG. 9 is a sectional view, with parts broken away, taken substantially along line 9-9 in FIG. 7;

FIGS. 10 and 11 are views that are similar to FIG. 9, with parts broken away, showing different stages of fork rotation; and FIG. 12 is an enlarged sectional view, with parts broken away, showing an embodiment of a cam device for guiding one of the forks over the other fork as the forks are rotated to effect reversal of fork direction.

DESCRIPTION OF THE PREFERRED EMBODIMENT

Figure 1:
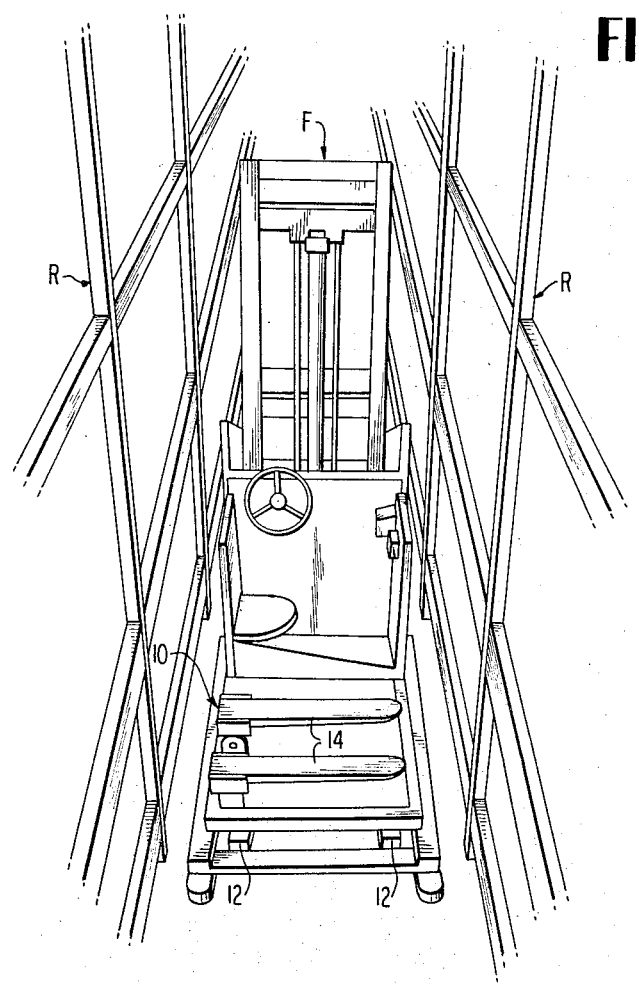
FIG. 1 is a perspective view of a lift vehicle positioned in an aisle between storage racks and utilizing the bi-directional side-loading fork apparatus of the present invention.
Figure 2:
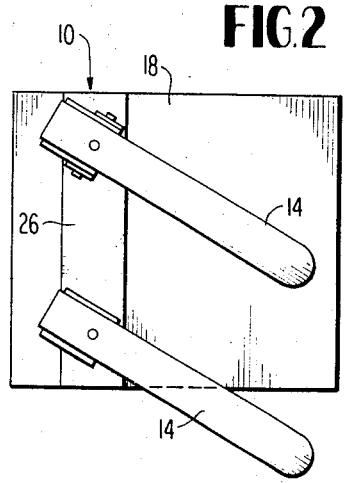
FIGS. 2 through 5 are schematic plan views showing the movement of the forks and shuttle platform of the present apparatus for the purpose of effecting fork rotation and reversal of fork direction.
Figure 3:
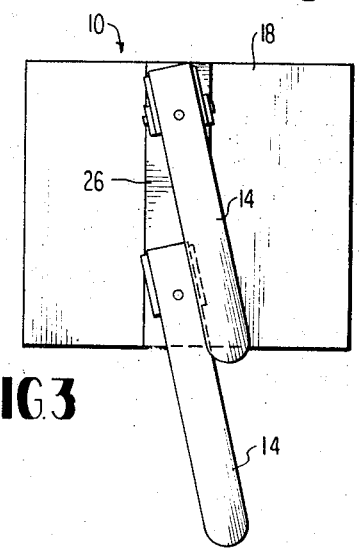
Figure 4:
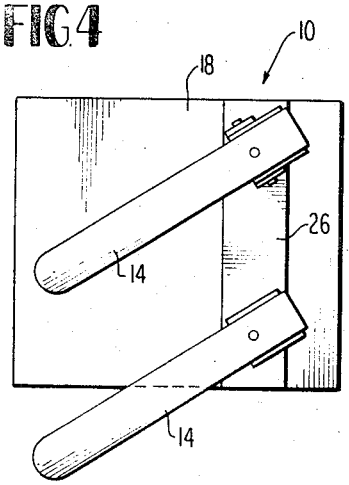
Figure 5:
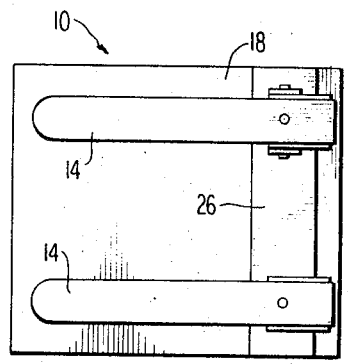

The side-loading, bi-directional fork apparatus of the present invention is designed for use with a lift vehicle F of the type shown in FIG. 1, wherein the vehicle F is adapted to move through aisles defined by storage racks R. The racks R may be of any suitable construction and are adapted to support pallets (not shown) which may be supported and conveyed by the fork apparatus 10 of the present invention. The fork apparatus 10 is mounted on a vertically movable base or mounting structure 12 of the fork lift vehicle F which may be of any suitable or conventional construction. As shown in FIG. 1, the fork apparatus 10 is of the side-loading type and the direction of the forks 14 is reversible such that the forks may engage, support and convey pallets to or from the storage racks R on either side of the aisle regardless of the position of the lift vehicle F.

FIGS. 2 through 5 illustrate schematically the manner in which the direction of the forks 14 is reversed. In general the forks 14 are rotatably mounted for independent rotation about substantially vertical axes on a shuttle platform or head 26 which is, in turn, mounted for lateral movement on a supporting frame 18 that is laterally movable on the base 12 of the lift vehicle F. The forks 14 and shuttle platform 26 are so interconnected that when the shuttle platform 26 is moved laterally from one side of the supporting frame 18 to the other side thereof, as progressively shown in FIGS. 2 through 5, the forks 14 are rotated through an angle of 180° to effect reversal of fork direction. As the shuttle platform 26 is moving laterally, and the forks 14 are being rotated, one of the forks is guided upwardly over the other fork by means to be described hereinafter, so that there is no interference between the forks as they are rotated and their direction is reversed.

By rotating the forks 14 in conjunction with the lateral movement of the shuttle platform 26, the direction of the forks is reversed without the forks extending beyond the lateral limits of the supporting platform 18, as shown in FIGS. 2 through 5. In this manner, the bi-directional, side-loading fork apparatus 10 of the present invention may be effectively utilized in aisles between storage racks that are of a width that only slightly exceeds that of the supporting frame 18.

Figure 6:
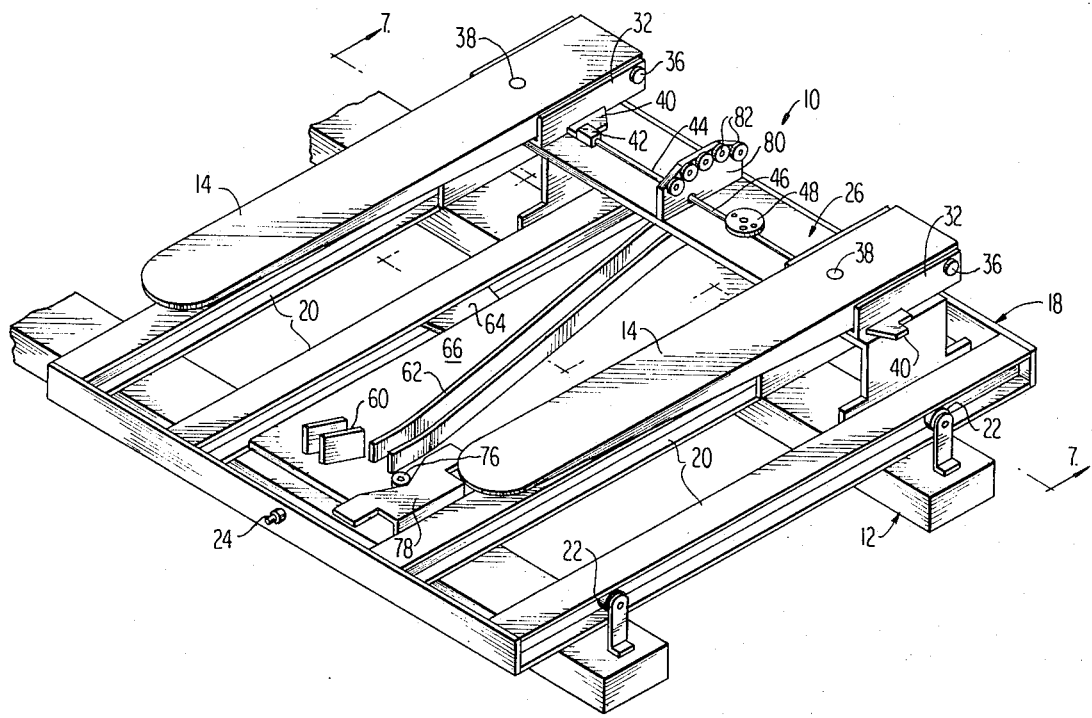
FIG. 6 is a perspective view of the bi-directional, side-loading fork apparatus of the present invention, showing the apparatus mounted on the base or mounting structure of a lift vehicle.
Figure 7:
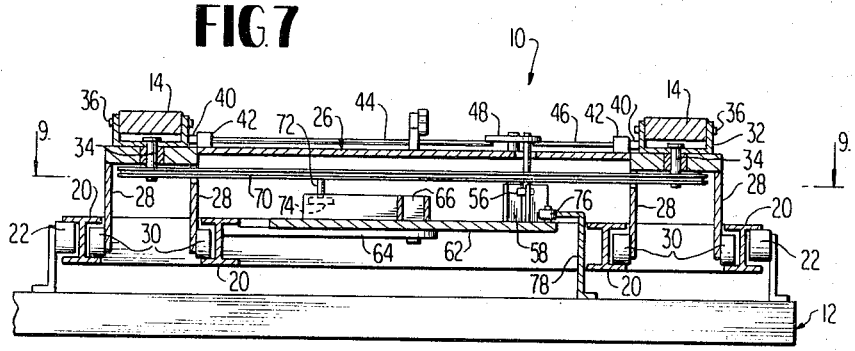
FIG. 7 is a sectional view taken substantially along line 7—7 of FIG. 6.
Figure 8:
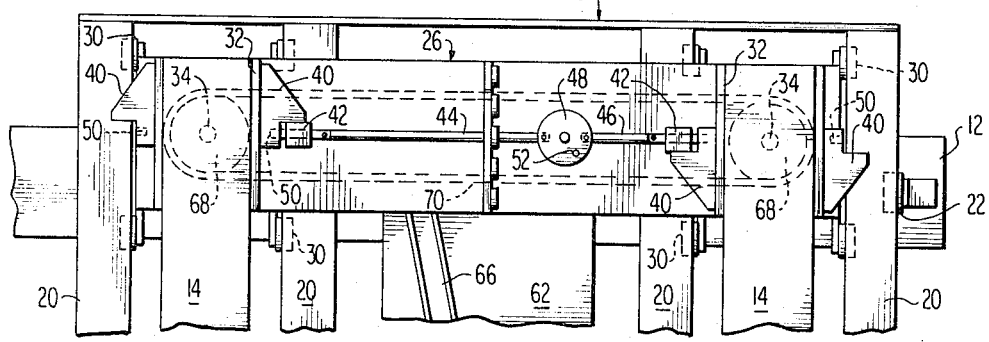
FIG. 8 is a plan view of a portion of the apparatus shown in FIG. 6.

A preferred embodiment of the bi-directional, side-loading fork apparatus 10 of the present invention is shown in FIGS. 6 through 12. Referring first to FIGS. 6 through 8, the supporting frame 18 comprises a plurality of spaced I-beams 20 and is slidably mounted on the vertically movable base or mounting structure 12 of the lift vehicle F by rollers 22 mounted on the base 12 and received within the outer I-beams 20. The movement of the supporting frame 18 relative to the base 12 may be effected and controlled in any suitable manner and by any suitable power and control means, such as mechanical, electrical or hydraulic means. Such power and control means are not disclosed herein since they form no part of the present invention. As an illustrative example, the supporting frame 18 could be provided with a stop or limit switch 24 at each side thereof which serves to stop lateral movement of the supporting frame 18 when it moves toward one of the storage racks R and the limit switch engages the rack.

A shuttle platform or head 26 is mounted on the supporting frame 18 and comprises a plurality of depending legs 28 supporting rollers 30 at the lower ends thereof which are received within the channels defined by the I-beams 20 of the supporting frame 18. Any suitable means (not shown) may be utilized for the purpose of effecting lateral movement of the shuttle platform 26 relative to the supporting frame 18.

Adjacent to each end of the shuttle platform 26, there is mounted a generally U-shaped bracket 32 that is secured to a pivot pin 34 that is pivotally mounted on the shuttle platform and extends downwardly through the bottom portion of the shuttle platform. The forks 14 are connected to the U-shaped brackets 32 at their rear portions by pivot pins 36 extending through the brackets and the forks. In this manner, therefore, each of the forks 14 and the brackets 32 is rotatable about a substantially vertical axis (pin 34), and each of the forks is rotatable about a substantially horizontal axis (pin 36). Each of the forks 14 may be adjusted vertically by actuating an adjusting means 38 such as a hydraulic cylinder or screw, or the like, to vary the spacing of the fork from the base portion of its respective bracket 32.

Referring now to FIGS. 6 and 8, each of the forks 14 is rotatable about the pins 34 through an angle of approximately 180° such that the direction of the forks may be reversed. The rotation of the forks 14 is limited to approximately 180° by stop plates 40 which are mounted on and extend outwardly from the legs of the brackets 32. The stop plates 40 are adapted to engage stop blocks 42 mounted on the shuttle platform 26 to thereby limit the rotational movement of the forks 14. Each of these stop blocks 42 is provided with an aperture extending therethrough that is adapted to slidably receive the end portion of a locking rod 44 or 46 that comprises pivotally connected sections and is pivotally secured at its opposite end adjacent the peripheral portion of a wheel 48 rotatably mounted on the shuttle platform 26. As shown in FIG. 8, the locking rods 44, 46 are adapted to extend through the stop blocks 42 and into bores 50 in the stop plates 40 adjacent the stop blocks 42 for the purpose of preventing rotational movement of the forks 14 and brackets 32 about the axes of the vertical pins 34.

A pin 52 is secured to the wheel 48 adjacent the peripheral portion thereof and extends downwardly through an aperture 54 in the shuttle platform 26. The pin 52 terminates at its lower end in a roller 56 which is adapted to enter cam grooves 58 and 60 provided in a cam plate 62 that is rotatably mounted on an arm 64 secured to an I-beam 20 of the supporting frame 18. As shown in FIGS. 9 through 11, the cam grooves 58 and 60 are disposed adjacent opposite ends of the cam plate 62, are aligned at their inner ends, and are angled in opposite directions.

The cam plate 62 also comprises an elongated cam groove 66 which extends throughout a substantial portion of the length of the cam plate 62 and angles from one side to the other side of the cam plate. A sprocket 68 is connected to the lower end of each of the pivot pins 34, and the sprockets 68 are drivingly connected by a chain 70. A pin 72, extending downwardly from the chain 70, supports a roller 74 that is adapted to be received within the cam groove 66 on the cam plate 62.

The cam plate 62 supports a pair of rollers 76 at opposite sides and adjacent opposite ends thereof. Each of these rollers 76 is positioned to engage an angled cam plate 78, as shown in FIGS. 6 and 9. The cam plates 78 are mounted on the base or mounting structure 12 of the lift vehicle F. When the supporting frame 18 is moved laterally relative to the base 12, therefore, the cam plate 62 is tilted to the broken line position shown in FIG. 9, owing to the movement of the cam plate 78 along the rollers 76.

A substantially vertically extending cam plate 80 is mounted on the upper surface of the shuttle platform 26 between the forks 14, and comprises a plurality of rollers 82 that are arranged in an upwardly sloped alignment or configuration, as shown in FIGS. 6 and 12. As the forks 14 are rotated about the pivot pins 34 for the purpose of changing their direction, one of the forks engages the cam rollers 82 and is lifted by the cam rollers over the other fork so that both forks may be rotated through an angle of 180° without interference. For the purpose of facilitating engagement of the forks 14 with the cam rollers 82, the engaging fork has chamfered sides 84 at the point of engagement, as shown in FIG. 12.

In operation, when it is desired to store or remove one or more pallets on or from one of the storage racks R, the base 12 of the lift vehicle F is moved vertically to the appropriate position and the support platform 18 is moved laterally along the base 12 until the stop switch 24 engages the adjacent portion of the storage rack, thereby terminating lateral movement of the supporting frame 18. This lateral movement of the supporting frame 18 serves to tilt the cam plate 62 to the broken line position shown in FIG. 9 as a result of the displacement of the rollers 76 by the sloped cam plates 78. In this tilted position of the cam plate 62, the cam groove 66 is moved out of alignment with the roller 74 secured to the drive chain 70, and the cam grooves 58 and 60 are moved out of alignment with the roller 56 connected to the pin 52 and wheel 48.

After termination of lateral movement of the supporting frame 18, therefore, the shuttle platform 26 may be moved laterally along the frame 18 without any rotational movement of the forks 14, owing to the locking position of the rods 44 and 46, which are in engagement with the stop plates 40, and the lack of a driving connection between the roller 74 and the cam groove 66. The shuttle platform 26 and forks 14 may then be used for stacking and unstacking pallets on a storage rack R on one side of the aisle in which the lift vehicle F is being operated. Upon completion of a stacking or unstacking operation, frame 18 is returned to the position shown in FIGS. 6 and 9, thereby moving cam plate 62 to solid line position shown in FIG. 9.

When it is desired to stack and unstack pallets on the storage rack R on the other side of the aisle, the supporting frame 18 is maintained in the position shown in FIGS. 6 through 9 wherein the rollers 76 on the cam plate 62 are in engagement with the center portion of the sloped cam plates 78, thereby maintaining the cam plate 62 in the solid line position shown in FIG. 9. In this position, the cam groove 66 is aligned with the roller 74, and the cam grooves 58 and 60 are aligned with the roller 56. When the shuttle platform 26 is then moved laterally relative to the supporting frame 18, the roller 56 enters the cam groove 58 and is moved to the left as shown in FIG. 9, thereby resulting in rotation of the wheel 48 (in a clockwise direction as shown in FIG. 8) and movement of the locking rods 44 and 46 out of the bores 50 in the stop plates 40. This movement of the locking rods 44 and 46 serves to free the forks 14 and brackets 32 for rotation about the axes of the vertical pins 34.

As the shuttle platform 26 continues to move laterally along the supporting frame 18, the roller 74 secured to the chain 70 enters the cam groove 66 and is moved in a direction substantially parallel to the axis of the aisle between the supporting racks R. This movement of the roller 74 results in movement of the chain 70 and rotation of the sprockets 68 and vertical pins 34, thereby resulting in pivotal movement of each of the forks 14 about a substantially vertical axis. This drive connection between the shuttle platform 26 and forks 14 is so constructed that movement of the shuttle platform from one side of the supporting frame to the other will result in rotation of the forks 14 through an angle of approximately 180°.

As the forks 14 are rotated through an angle approaching 90°, one of the forks engages the rollers 82 mounted on the cam plate 80 and is pivoted upwardly along the path defined by the rollers 82 so as to move over the other fork 14 to avoid any interference between the forks as they are rotated through the 180° angle. This rotation of the forks 14 takes place as the shuttle platform 26 is moving laterally along the supporting frame 18 in such a manner that the forks 14 are never extended laterally outwardly beyond the sides of the supporting frame 18. In this manner, the aisle space between the supporting racks R need only be slightly larger than the width of the supporting frame 18.

As the shuttle platform 26 approaches the opposite side of the supporting frame 18, and the forks 14 have rotated through the 180° angle, the roller 56 enters the cam groove 60 and is moved to the right as shown in FIGS. 9 through 11, which serves to rotate the wheel 48 (in a counterclockwise direction as shown in FIG. 8) to again move the locking rods 44 and 46 into the bores 50 in the stop plates 40 in engagement with the stop blocks 42 that serve to limit rotation of the forks 14. This serves to lock the forks 14 and prevent any further rotation thereof. The forks are now in a position for stacking or unstacking pallets on the opposite side of the aisle between the storage racks R.

Although the cam and roller arrangement disclosed herein possesses certain advantages over other drive and control systems for the rotation of the forks 14, it is noted that any other suitable drive or control system could be utilized for effecting rotation of the forks 14 in the manner described herein. For example, other types of mechanical drive and control systems could be utilized, or hydraulic or electrical drive and control systems could be utilized, without departing from the principles of the present invention. The cam and roller arrangement disclosed herein is advantageous in that it avoids external connections between the fixed and moving structures of the present apparatus, automatically synchronizes fork rotation with lateral movement of the shuttle platform, and effects low impact at the end portions of the paths of travel of the forks and shuttle platform.

What is claimed is:

1. Bi-directional fork apparatus adapted to be mounted on a vertically movable base of a lift vehicle, said fork apparatus comprising:
   a supporting frame adapted to be mounted for lateral movement on the base of the lift vehicle,
   a shuttle platform mounted for lateral movement on said supporting frame,
   a pair of forks rotatably mounted in spaced relation on said shuttle platform for rotation about substantially vertical axes through an angle of approximately 180° to effect reversal of fork direction, said forks being mounted on said shuttle platform so as to enable said forks to be moved vertically relative to said platform,
   means operatively connecting said forks, said shuttle platform and said supporting frame to effect rotation of said forks in response to lateral movement of said shuttle platform, said connecting means being so constructed as to effect rotation of said forks within the lateral limits of said supporting frame, and
   means on said shuttle platform for guiding one of said forks upwardly over the other fork as they are being rotated to effect reversal of fork direction.

2. The fork apparatus of claim 1 wherein said forks are independently mounted on said platform for rotation about substantially vertical and substantially horizontal axes.

3. The fork apparatus of claim 1 wherein said means operatively connecting said forks, said platform and said frame comprise a roller connected to said forks and a cam plate mounted on said supporting frame, said cam plate having a cam track adapted to receive said roller when said platform is moved laterally relative to said supporting frame.

4. The fork apparatus of claim 1 further comprising means operatively connecting said forks and said shuttle platform to effect lateral movement of said forks coincident with lateral movement of said shuttle platform in response to lateral movement of said supporting frame, said last-mentioned connecting means being so constructed as to effect lateral movement of said forks and shuttle platform substantially parallel to the horizontal axis of said supporting frame.

5. The fork apparatus of claim 1 wherein each of said forks is tiltable about a substantially horizontal axis and further comprising means on the shuttle platform for tilting the horizontal plane of said forks relative to the horizontal plane of said supporting frame to compensate for cumulative deflection of said forks when subjected to loading.

6. The fork apparatus of claim 1 further comprising means to prevent rotation and cause lateral movement of said forks when said supporting frame is moved laterally relative to said base.

7. The fork apparatus of claim 1 further comprising means to prevent rotation of said forks when they are in predetermined positions approximately 180° apart.

8. The fork apparatus of claim 7 further comprising means to release said rotation preventing means when said shuttle platform is moved laterally relative to said supporting frame.

9. The fork apparatus of claim 8 wherein said release means comprises a roller connected to said rotation preventing means, and a cam plate mounted on said supporting frame, said cam plate having cam tracks adapted to receive said roller when said platform is moved laterally relative to said supporting frame.

10. The fork apparatus of claim 7 wherein said means to prevent rotation comprise cam tracks mounted on said base, and a cam plate rotatably mounted about a substantially vertical axis on said supporting frame, said cam plate having rollers engaging said cam tracks such that said cam plate is rotated about said axis when said supporting frame is moved laterally relative to said base.

11. The fork apparatus of claim 1 wherein said guiding means comprises a cam plate having a plurality of rollers for engaging and guiding said one fork as it is being rotated.

12. The fork apparatus of claim 11 wherein said rollers are arranged in an upwardly sloped path.

13. The apparatus of claim 12 wherein said forks have chamfered sides to facilitate engagement with said guide rollers.

14. The fork apparatus of claim 5 wherein the tilting means comprises an adjusting screw to vary the spacing between said forks and said shuttle platform.

15. The fork apparatus of claim 5 wherein the tilting means comprises a hydraulic cylinder mounted on each said fork to vary the spacing between said forks and said shuttle platform.

16. Bi-directional fork apparatus, comprising:
   supporting means,
   shuttle means mounted for lateral movement on said supporting means,
   a pair of forks rotatably mounted in spaced relation on said shuttle means for rotation about substantially vertical axes through an angle of approximately 180° to effect reversal of fork direction, said forks being mounted on said shuttle means so as to enable said forks to be moved vertically relative to said shuttle means,
   means operatively connecting said forks and said shuttle means to effect rotation of said forks in response to lateral movement of said shuttle means, said connecting means being so constructed as to effect rotation of said forks within the lateral limits of said supporting means, and
   means on said shuttle means for guiding one of said forks upwardly over the other fork as they are being rotated to effect reversal of fork direction.

* * * * *